G. Hatheway,
Making Staves.

N°6,380.  Patented Apr. 24, 1849.

2 Sheets. Sheet 1.

2 Sheets—Sheet 2.

G. Hatheway,
Making Staves.

Nº 6,380. Patented Apr. 24, 1849

UNITED STATES PATENT OFFICE.

GILBERT HATHEWAY, OF ROCHESTER, MASSACHUSETTS.

SAWMILL WITH CYLINDRICAL SAWS.

Specification of Letters Patent No. 6,380, dated April 24, 1849.

*To all whom it may concern:*

Be it known that I, GILBERT HATHEWAY, of Rochester, county of Plymouth, and State of Massachusetts, have invented sundry new and useful Improvements in Cylindrical Circular-Saw Mills, and that the following is a full, clear, and exact description thereof, reference being had to the accompanying drawings, of which—

Figure 2:
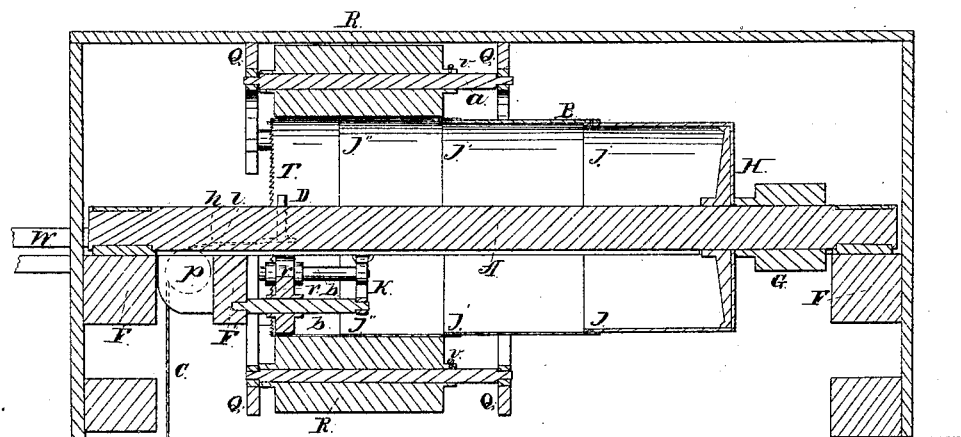
Figure 1:
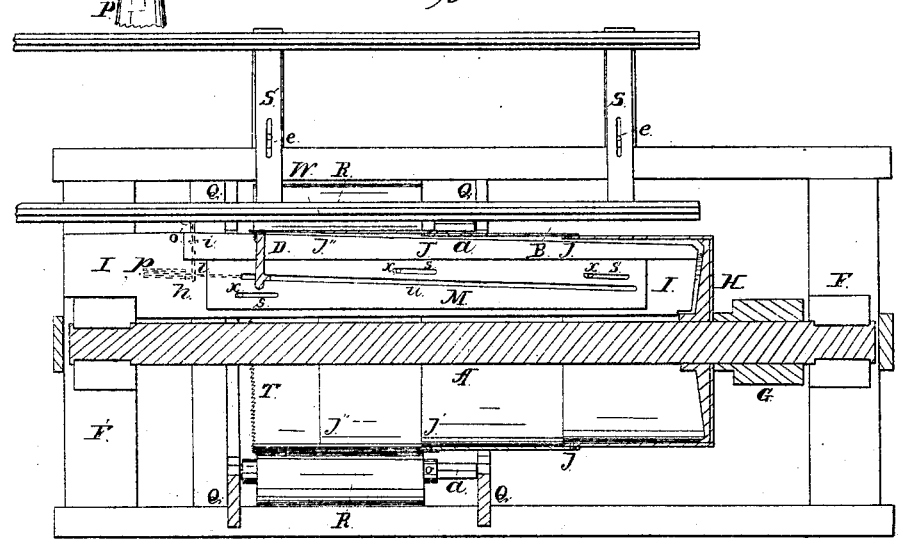
Figure 3:
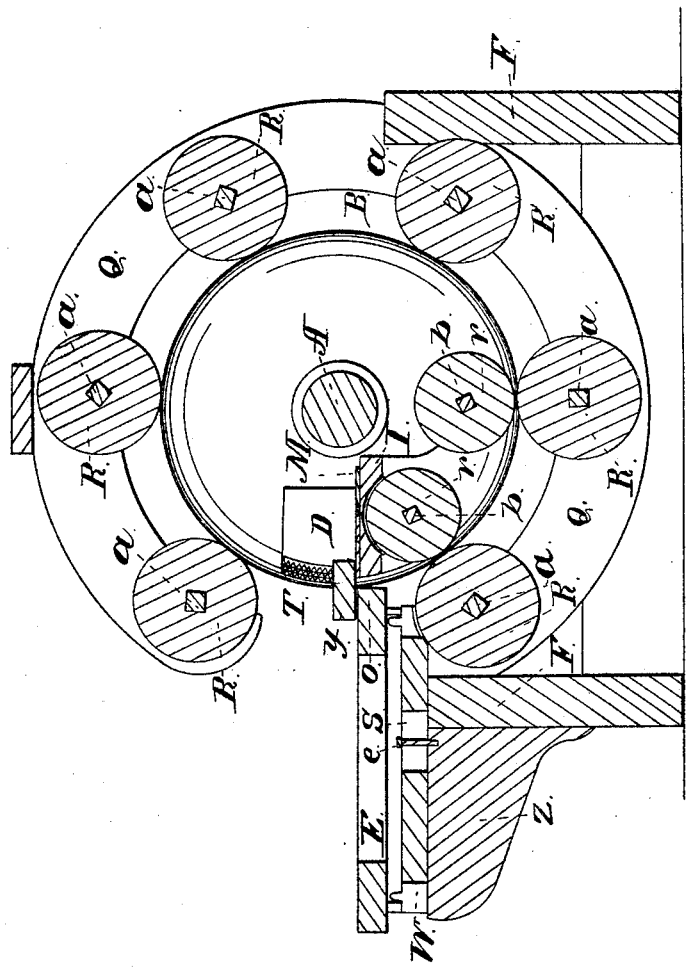

Figure 1, is a horizontal, Fig. 2, a vertical longitudinal, and Fig. 3, a transverse section.

The nature of my invention consists in the manner of constructing the cylinder or barrel of my saw, the mode of arranging and adjusting the carriage-ways, of my mill, and the grinding and fixing of a movable dog, and in the retaining of the form of a thin cylindrical saw while performing its work.

I do not claim the invention of cylindrical saws for cutting timber into concave-convex forms, as I am aware that saw mills for that purpose have long been known and used; but, in the construction and use of such mills, the employment of saws of uniform thickness and similar material throughout, has involved the use of metal of greater thickness than is necessary, and of course has required the cutting away of more timber than is desirable. The manner also in which cylindrical saws have been used has involved an unnecessary expenditure of power owing to the friction of the stuff against the inside and outside of the barrel of the saw; and in addition to these inconveniences and disadvantages, the cost of constructing cylindrical saws of single pieces, having a uniform thickness, is a great impediment to their general introduction into use. The attempt to reduce the thickness of the cutting edge while retaining the usual construction of such saws, is attended with the important evil of changing the cylindrical into ellipsoidal forms while undergoing a rapid rotation. All these disadvantages it is the purpose of my invention to prevent.

1st. I construct my mill with a strong and substantial frame F, the cross pieces of which support the axis A, of the saw barrel B. Near one end of the axis is the head H, of the saw barrel, made of thick and strong metal, either cast or wrought, and connected to this, is a strong metallic cylinder, either cast in one piece with the head, or of wrought metal attached to it by screws, bolts, or other convenient fastenings. This cylinder is generally of smaller diameter than that which at the opposite end of the barrel carries the saw teeth. To the outer end of the same cylinder is connected by means of a lapped, beveled, or halved joint a second cylinder of thinner metal than the first; and to that may be added a third piece, of still less thickness, and to the last may be joined the thin cylindrical saw plate of such width as may be deemed necessary, having its outer surface dressed even with the iron, copper or other metal to which it may be joined. Instead of a steel saw plate I may sometimes in the thinnest iron cylinder insert teeth of steel in a manner often practised in forming circular disk saws.

The form of my barrels will be understood from Figs. 1, and 2, where the joints $j$ $j'$ and $j''$ are formed by cylinders of increasing diameters and diminishing thicknesses, lapped upon each other and fastened with flush bolts or countersunk screws. The advantage which I derive from lap joints is to give stiffness to the barrel without inconveniently increasing its weight.

I contemplate making the barrels in some cases in single pieces either of cast or wrought metal diminishing in thickness toward the saw-end, affording stiffness enough for all purposes; and as the saw may thus be made to cut a thin kerf, the quantity of timber wasted and of power consumed will be proportionately small. This barrel possesses great strength and stiffness, is cheap in construction, and allows the use of a thin saw.

2nd. The carriage ways of my cylindrical saw mill are represented at W, Figs. 1, 2, and 3, and are attached by screws $e$, $e$, passing through the slots S, into the frame F, or bracket Z. By means of the slots and screws, the carriage ways may be set either parallel to, or at any desired angle with, the axis A, of the saw. I contemplate in general using the carriage ways with a slight declination from the axis in the direction of its advance motion, as seen in Fig. 1. The carriage itself is represented at E, Fig. 3, and the timber to be sawed at Y, which figure also shows three rows of teeth on the movable dog D, situated near the cutting edge of the saw T. This declination of the carriage ways prevents the friction of the stuff against the outside of the barrel B.

3rd. To the frame F' is firmly attached a plank I, reaching on the interior of the barrel B, nearly to the head H. Upon this plank is attached the metallic plate M, in which is a slot $u$, placed over a wider groove in the plank I. Along the groove slides the dog D, Fig. 1. This plate may by means of the slots $s, s, s$, and the set-screws $x, x, x$, be adjusted to a greater or less distance from the head of the barrel H. This adjustment is intended to allow for the wearing up of the saw plate, and to bring the teeth of the dog to a convenient distance from the cutting edge of the saw. The slot $u$ will be placed inclined to the axis A, in such manner as to draw the end of the stuff cut, away from the inner surface of the barrel B. By this arrangement will be effected the double purpose of keeping the stuff sawed, out of contact with the joints $j, j', j''$, of easing the saw from friction, and thereby saving power. As the mill carriage E, advances the saw cuts the timber, and the dog is pushed forward, and is kept securely set into the wood by the weight P, (Fig. 2,) suspended to the cord C, passing over the pulley $p$. This cord is attached to the hook $h$, near the end of a rod which unites it with the dog D.

4th. In order to give the dog a firm set into the end of the timber, I shall when necessary, make use of a latch $l$, moving vertically on an axis $i$, (Fig. 1,) placed on the part of the frame of the mill which is contiguous to the carriage F. On the side of the carriage is a curved projection $o$, which in passing either forward or backward over the outer end of the latch $l$, lifts it out of the hook $h$. The purpose of this curved projection is to release the dog and allow it to slide as soon as its teeth have been driven a sufficient distance into the end of the timber. This projection $o$, is capable of being set by adjusting screws at a suitable point on the carriage to correspond at all times to the existing position of the plate M, in which the dog moves. After a piece of stuff has been cut off from the log Y, (Fig. 3)—the weight P, immediately descends pushing the stuff before the dog, and bringing the slope of the hook $h$ under the latch $l$, raises it, and allows it to drop into the catch. When the carriage is subsequently drawn back, the projection $o$, lifts the latch momentarily but allows it again to drop into its place and remain until the timber is again fixed on the dog D, as above described.

5th. As the saw will be made to revolve with great rapidity, and its thinness will require that guides be employed to steady its action and prevent change of form, I place in a strong cast iron or other frame Q, four or more cylindrical guides R, R, R, &c, to revolve on their axes $a, a, a$, &c, of which the parts passing through the cylinders are square and longer than the cylinders themselves, allowing of a sliding motion and of adjustment by set screws $v, v$, so that the outer ends of the cylindrical guides may be placed at the roots of the saw teeth, and be drawn backward as the saw plate wears away. In combination with these extension guides of the saw, I use two or more interior cylindrical guides $r, r$, attached at one end of their axes $b, b$, by a bracket K, to the plank I, on its under side, and at the other end to the frame work of the mill F''. These inner and outer rolls coöperate to maintain the cylindrical form and secure the steady action of the saw, while revolving with great rapidity.

What I claim as my invention and desire to secure by Letters Patent, is—

1. The forming of the carriage-ways of a cylindrical saw mill, with arrangements for laterally inclining their position, with reference to the axis of the saw barrel, for the purpose of preventing the friction of timber against the outside of the barrel substantially as herein described.

2. I also claim the movable dog, sliding on a support in the interior of a saw barrel, in a groove inclined toward the axis thereof, and acting to keep the end of the piece of stuff which has been cut, slightly bent as it advances, and out of contact, and consequently free from friction against the interior surface of the barrel whereby I am enabled to use a saw-barrel of increasing thickness from the cutting toward the supporting end of said barrel in the manner and for the purposes herein set forth.

3. I also claim the combining of one or more inside, with four or more outside cylindrical revolving guides, all capable of sliding longitudinally on their respective axes, so as to accommodate their positions to the gradual wearing away of the saw; and acting to prevent changes in its cylindrical form while undergoing rapid revolution.

GILBERT HATHEWAY.

Witnesses:
 WALTER R. JOHNSON,
 L. WILLIAMS.